No. 725,034. PATENTED APR. 14, 1903.
F. A. BROWNELL.
PHOTOGRAPHIC CAMERA.
APPLICATION FILED JULY 25, 1900.
NO MODEL. 2 SHEETS—SHEET 1.
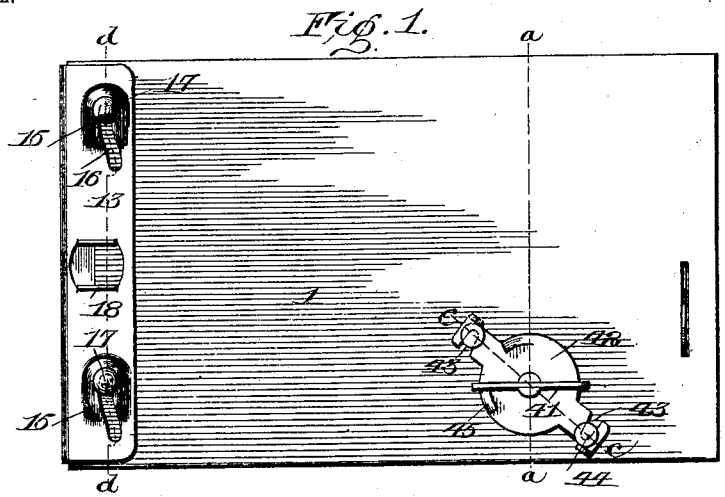
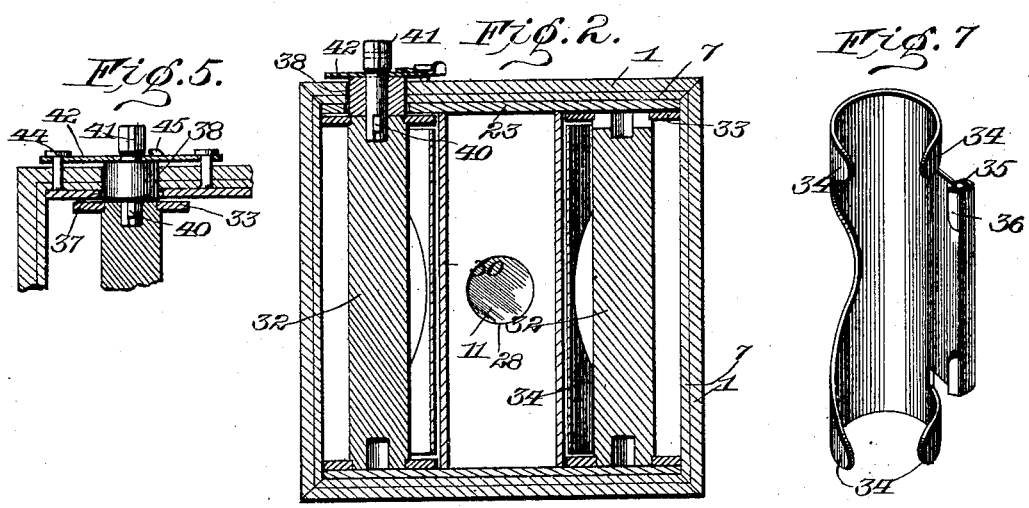
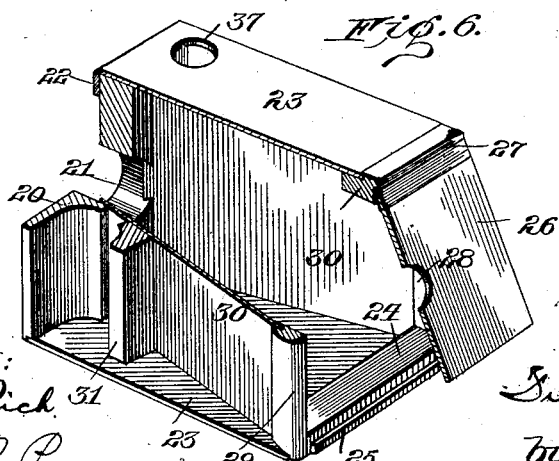
Witnesses:
G. Willard Rich.
Walter B. Payne.
Inventor,
Frank A. Brownell
by Frederick L. Church
his Attorneys No. 725,034. PATENTED APR. 14, 1903.
F. A. BROWNELL.
PHOTOGRAPHIC CAMERA.
APPLICATION FILED JULY 25, 1900.
NO MODEL. 2 SHEETS—SHEET 2.
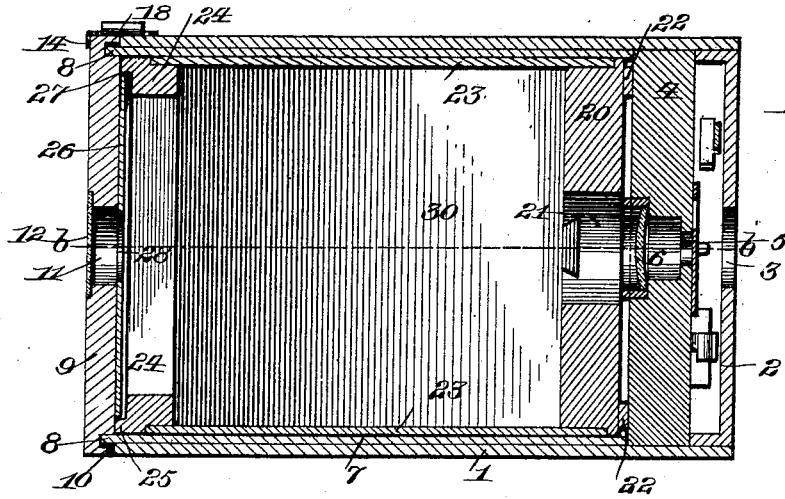
Fig. 3.
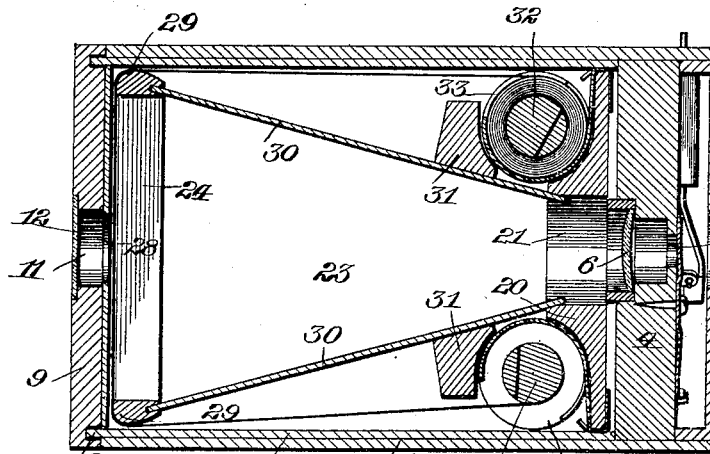
Fig. 4.
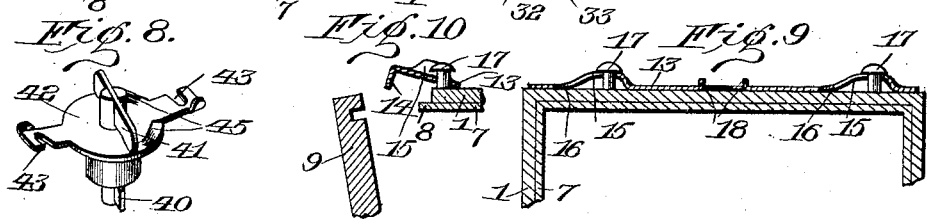
Witnesses:
G. Willard Rich.
Walter B. Payne.
Inventor,
Frank A. Brownell
by Frederick S. Church
his Attorney

UNITED STATES PATENT OFFICE.

FRANK A. BROWNELL, OF ROCHESTER, NEW YORK, ASSIGNOR TO THE EASTMAN KODAK COMPANY, OF ROCHESTER, NEW YORK, A CORPORATION OF NEW YORK.

PHOTOGRAPHIC CAMERA.

SPECIFICATION forming part of Letters Patent No. 725,034, dated April 14, 1903.

Application filed July 25, 1900. Serial No. 24,799. (No model.)

*To all whom it may concern:*

Be it known that I, FRANK A. BROWNELL, of Rochester, in the county of Monroe and State of New York, have invented certain new and useful Improvements in Photographic Cameras; and I do hereby declare the following to be a full, clear, and exact description of the same, reference being had to the accompanying drawings, forming a part of this specification, and to the reference-numerals marked thereon.

My present invention has for its object to provide a photographic camera adapted particularly for using photographic-film cartridges and which shall be of such a nature that it may be readily manufactured of inexpensive material, such as heavy cardboard and wood, and at the same time be sufficiently substantial to withstand all the rough usage to which such articles are liable to be subjected; and to these and other ends the invention consists in improvements hereinafter described, the novel features being pointed out in the claims at the end of this specification.

In the drawings, Figure 1 is a plan view of a camera constructed in accordance with my invention; Fig. 2, a cross-sectional view on the line $a\ a$ of Fig. 1 looking toward the left; Fig. 3, a longitudinal sectional view; Fig. 4, a horizontal sectional view on the line $b\ b$ of Fig. 3; Fig. 5, a sectional view on the line $c\ c$ of Fig. 1; Fig. 6, a view of the film-holding frame or device removed from the casing; Fig. 7, a perspective view of one of the spool-holding clips removed; Fig. 8, a perspective view of the winding-key and its holding-plate; Fig. 9, a sectional view on the line $d\ d$ of Fig. 1; Fig. 10, a detail sectional view of the locking device for the rear door of the casing, showing said door partly open.

Similar reference-numerals indicate similar parts.

The main casing of the camera is preferably composed of a single strip of heavy cardboard or similar material suitably scored at intervals to form the top, bottom, and sides and then folded up on the scored lines to form a rectangular tubular casing, (indicated by 1,) one end of this casing being closed by an end piece 2, also preferably constructed of heavy cardboard and provided with a central aperture 3. Just inside of this end piece is a lens-board 4, preferably made of wood, upon the front side of which is mounted a shutter (indicated by 5) of any suitable construction, said board having a central aperture and the lens 6 mounted therein, as shown in Figs. 3 and 4. The portion of the casing in rear of the door 4 is preferably provided with a lining 7 of cardboard slightly thinner than that forming the exterior portion of the casing, which lining serves to stiffen the parts, and also as the rear end extends a little beyond the end of the casing it forms a projecting flange 8, adapted to extend into a corresponding groove formed in the rear door 9 of the casing, said door being hinged to the casing at its lower end by a flexible hinge composed, preferably, of fabric or leather (indicated by 10) and provided with a central aperture 11, preferably covered by a piece of non-actinic material 12, such as red celluloid. The upper edge of the rear door 9 is clamped and locked by means of a fastening device consisting of a plate 13, having a downwardly-extending flange 14 at the rear and also provided with inclined embossed portions 15 near the ends, in which embossed portions and also in the flat portion of the plate are cam-slots 16 for the passage of the shanks of headed pins 17, secured to the casing. The plate 13 is also preferably provided with upwardly-extending ears 18, by which it may be manipulated. From the above construction it will be seen that when this locking-plate is in the position shown in Fig. 1 the cam-slots engaging the shanks of the pins will draw the flange of the plate inward toward the end of the casing, holding the door of the latter tightly closed, and the embossed portions, which are inclined toward one end, clamp the plate down on the casing; but when said plate is moved in the direction of the arrow in Fig. 1 the plate is caused by the cam-slots to move to the rear, and as the heads of the pins 17 are then free of the embossed portions the plate may be tilted slightly, as shown in Fig. 10, so as to release the flange from the door and permit the latter to be opened for the removal of the film-holding frame, as will be described.

The camera is particularly adapted for holding film-cartridges composed of a flanged spool and a strip of black paper and sensitive photographic film wound together upon a spool in such manner that the black paper covers the film and is provided upon its outer side with suitable indicating-marks at the center of each exposure and preferably severing-marks to indicate where the exposures are to be separated. In the present construction these cartridges are supported in a film-carrying frame which is separate from the casing proper, but located within the latter and adapted to be inserted and removed through the rear aperture thereof when the door is open. In order to make the film-carrying frame as light and cheap as possible, I prefer to construct it of a front board 20, provided with the central aperture 21, said board being of substantially the full width of the casing and fitting therein in close proximity to the board 4, carrying the lens, suitable small spacing-blocks 22 being interposed, if desired, as shown in Fig. 3. The rear face of this front board 20 is slightly rounded at the outer sides, as shown in Fig. 4, and the upper and lower edges are slightly recessed, as shown in Fig. 3, for the reception of the forward ends of the top and bottom pieces 23, preferably of cardboard, the rear ends of said pieces being received in rabbets or recessed portions at the upper and lower ends of a rear frame 24, which is preferably of wood and of substantially the same height as the lining of the casing. This frame 24 is open and of substantially the size of the exposure to be made by the camera, and it is provided at top and bottom with rearwardly-projecting flanges 25 (shown in Fig. 3) and also with a flap or cover-piece 26, hinged at 27 and of slightly less thickness than the length of the flanges 25, so that the paper and film may extend across the rear of the frame 24, while the flanges 25 will abut against the front side of the door 9 when closed, and light friction will be offered to the back of the black paper of the film-cartridge by the flap 26, although the latter will not offer too great resistance to the movement of the film and paper. The flap 26 is provided with a central aperture 28, through which the indications on the paper of the cartridge may be observed. The sides of the frame 24 are rounded slightly at 29 (shown in Fig. 4) and the front edges of the sides provided with slits for the reception of the rear edges of the partitions 30, of sheet material, such as cardboard, the forward ends of said partitions extending toward the center of the front board 20 and being secured in slots formed in the rear of the front board, this construction forming a central tapering exposing-chamber, of which the frame 24 forms the rear and the board 20 the front, and also leaving film-chambers between the outer sides of the partitions and the casing or lining thereof. To further strengthen the top and bottom pieces 23, which, as stated, are of thin cardboard, and also to form the rear sides of the open-sided film-pockets, I extend between the said top and bottom pieces 23 strengthening-strips 31, formed of wood or other light material.

The film-spools 32 are provided at the end with flanges 33 and at one end with a recess for the reception of the laterally-extended lug on a winding-key, the flanges being of a diameter substantially equal to the space between the strips 31, the rear side of the front board 20, and the inner side of the casing. The spools are held in the pockets in the outer side of the film-holding frame by removable clips, (shown in Figs. 4 and 7,) composed, preferably, of a single piece of spring sheet metal provided with the spring-fingers 34, adapted to partially encircle the film and paper on the spool and to offer a slight friction, preventing the accidental unrolling of the film and paper, said clips being further provided with the fingers or extensions 35, adapted to extend around the edges of the front board 20 and to grip the same with slight friction, and they are further provided with ears or lugs 36, by which the clips can be readily grasped by the finger of the operator and removed from the said front board when the holding-frame is removed from the casing. The top of the holding-frame is provided with an aperture 37, (shown in Figs. 2 and 6,) and the casing 1 is also provided above this with an aperture 38, through which extends the shank of the winding-key. This winding-key is provided at its inner end with laterally-extending lugs 40, adapted to enter the slot in the end of the winding or take-up spool, and is provided at its outer end with a flat handle 41, and arranged between said handle and the enlarged shank of the key is a plate 42, preferably constructed of spring metal and bent so that the ends have a tendency to spring vertically, and said ends are provided with slots 43, forming hooks adapted to pass beneath the heads of pins 44, secured to the casing. (Shown in Figs. 1, 5, and 8.) The plate 42 is also provided with the upwardly-extending spring-tongues 45, adapted to engage with the lower edge of the handle 41 after the manner of a spring-pawl, being so arranged that while the handle can be turned freely in one direction to wind the film if it is wound in the opposite direction it will engage one or the other of the tongues 45, and turning the plate 42 will disengage the ends of the latter from the pins 44. From this construction it will be seen that while the winding-key may be rotated in the direction of the arrow in Fig. 1 to wind the film upon the supply-spool if said key is wound in the opposite direction it will disengage the plate 42 from the casing, when the key and said plate may be readily removed, and this removal of the key is necessary when the film-holding frame is to be taken out of the casing by opening the rear door of the latter.

The manner of loading and manipulating cameras of this general description being well known, it is unnecessary to specifically describe it herein.

The camera as a whole is very cheap, being made of light inexpensive material, and the construction described is such as to enable it to be made of this material and still retain the required rigidity for all practical purposes.

When the film-holding frame is in place, it is effectually secured by the rear door, which clamps it against the lens-board by reason of the cam action of the door-securing device.

I claim as my invention—

1. In a photographic camera, the combination with the casing, having the lens-opening and lens at the forward end, the door-opening and the door at the rear end, and a fastening device for said door arranged on the casing, of a film-holding frame located in the casing and removable through the door-opening, said holding-frame embodying the front board fitting within the casing and provided with an aperture arranged in line with the lens, the rear open frame, the top and bottom pieces of sheet material, and the partitions between the top and bottom pieces extending from the rear frame to the front board and forming the tapering exposing-chamber, and the perforated rear flap hinged at one edge to the rear frame.

2. In a camera, the combination with the casing having the lens-opening and lens at the forward end and the door-opening and a perforated hinged door at the rear end, and a fastening device for said door arranged on the casing, of the film-holding frame located in the casing and removable through the door-opening, said holding-frame embodying the front board fitting in the casing and provided with an aperture arranged in line with the lens, the rear frame having the top and bottom flanges at the rear, the top and bottom pieces of sheet material connected to the top and bottom of the front board and rear frame, and the inclined partitions at the sides extending from opposite sides of the aperture in the front board to the edges of the rear frame forming a tapering exposing-chamber.

3. In a camera, the combination with the casing having the lens-opening and lens at the forward end, the door-opening and the perforated door at the rear end, and means arranged on the casing for fastening the door, of the film-holding frame arranged in the casing and removable through the door-opening therein, said holding-frame embodying the front board fitting the interior of the casing and having the central opening and the vertical slots in its rear side, the rear frame also fitting in the casing having the rearwardly-extending flanges at top and bottom and the slots in its forward side, the top and bottom pieces of sheet material connected to the front board and rear frame, and the partitions of sheet material fitting in the slots in the front board and rear frame, forming the central exposing-chamber.

4. In a camera, the combination with the casing having the lens-opening and lens at one end, the door-opening and the perforated door at the opposite end, and fastening devices for the latter, of the removable film-holding frame arranged in the casing and removable through the door-opening, said frame embodying the perforated front board fitting in the casing having the vertical slots on opposite sides of the perforations, the rear frame having the rearwardly-extending flanges and the hinged perforated flap, the top and bottom pieces secured to the front board and rear frame, and the inclined partitions secured in the front board and frame forming a tapering exposing-chamber, and the strips secured to the outer sides of the partitions and to the top and bottom pieces in rear of the front board to form film-pockets at each side of the exposing-chamber.

5. In a camera, the combination with the casing having the lens-opening and lens at one end, the perforated door at the other end and the pivoted and laterally-movable clamping-plate engaging the casing and the edge of the door for securing the latter, of the removable film-carrying frame in the casing having the tapering exposing-chamber and the open film-pockets on the outer sides.

6. In a camera, the combination with the casing having the perforated door at one end, the flanged locking-plate for securing the door having the inclined slots and the headed pins in the slots, of a removable film-holding frame located in the casing having the open film-pockets on the outer sides.

7. In a camera, the combination with the casing having the door at one end and the pins on the casing, the flanged locking-plate provided with the cam-slots and the inclined embossed portion at the sides, of a film-carrying frame embodying a tapering exposing-chamber, and open-sided film-pockets at the sides, said frame being engaged and held by the door.

8. In a camera, the combination with the casing having the door at one end, and a clamping-plate movable transversely of the casing for engaging and pressing the door closed, of a removable film-holding frame located in the casing having open film-pockets at the sides, said frame being engaged and held by the door.

9. In a camera, the combination with a casing provided with a door at one end, a removable film-holding frame located in the casing adapted to be engaged and held by the door, and provided with open film-pockets at the sides, of a fastening device arranged between the free edge of the door and the casing, embodying the flanged plate having the embossed portions, the inclined slots therein and the headed pins passing through the slots.

10. In a camera, the combination with the casing having the door at one end and fastening devices therefor, of the film-holding frame located in the casing and removable through the door-opening having the perforated front board, the apertured rear frame and the spool-holding clips having the spring-fingers engaging the edge of the front board and the spring-fingers extending partially around and embracing a spool of film.

11. In a camera, the combination with a casing, of a film-holding frame located within the casing and removable therefrom and embodying the perforated front board and an open rear frame, of holding-clips for spools of film constructed of sheet metal and embodying the fingers for engaging the edge of the front board and the curved spring-fingers extending around the film-spool.

12. In a camera, the combination with a casing, of a film-holding frame located within the casing and removable therefrom and embodying the perforated front board and the open rear frame, of the removable holding-clips for spools of film constructed of sheet metal and embodying the fingers extending over the edge of the front board, and the curved spring-fingers extending around the spool, and a removable winding-key extending through the casing and engaging a spool held in a clip.

13. The combination with the casing and a removable film-holding frame located therein, of the removable spool-winding key extending through the casing having the operating-handle, and a portion to engage and wind a spool, the plate in which the key is journaled, and engaging projections on the plate and casing.

14. The combination with a casing, a removable spool-winding key having an operating-handle and a portion to engage and wind a spool within the casing, of the spring-plate beneath the operating-handle of the key, having the hooked ends and projections on the casing with which said ends engage to retain the key.

15. In a camera, the combination with a casing having an aperture and projections at the sides, a removable spool-winding key extending through the aperture, having an operating-handle and a portion to engage a spool in the casing, of the removable plate beneath the handle having hook-like projections engaging those on the casing, and a spring-tongue for engaging the handle when rotated backwardly.

FRANK A. BROWNELL.

Witnesses:
ELIZABETH B. ROBY,
GEORGE BAXTER.